G. R. NEBINGER.
Broom Head.
No. 54,391.
Patented May 1, 1866
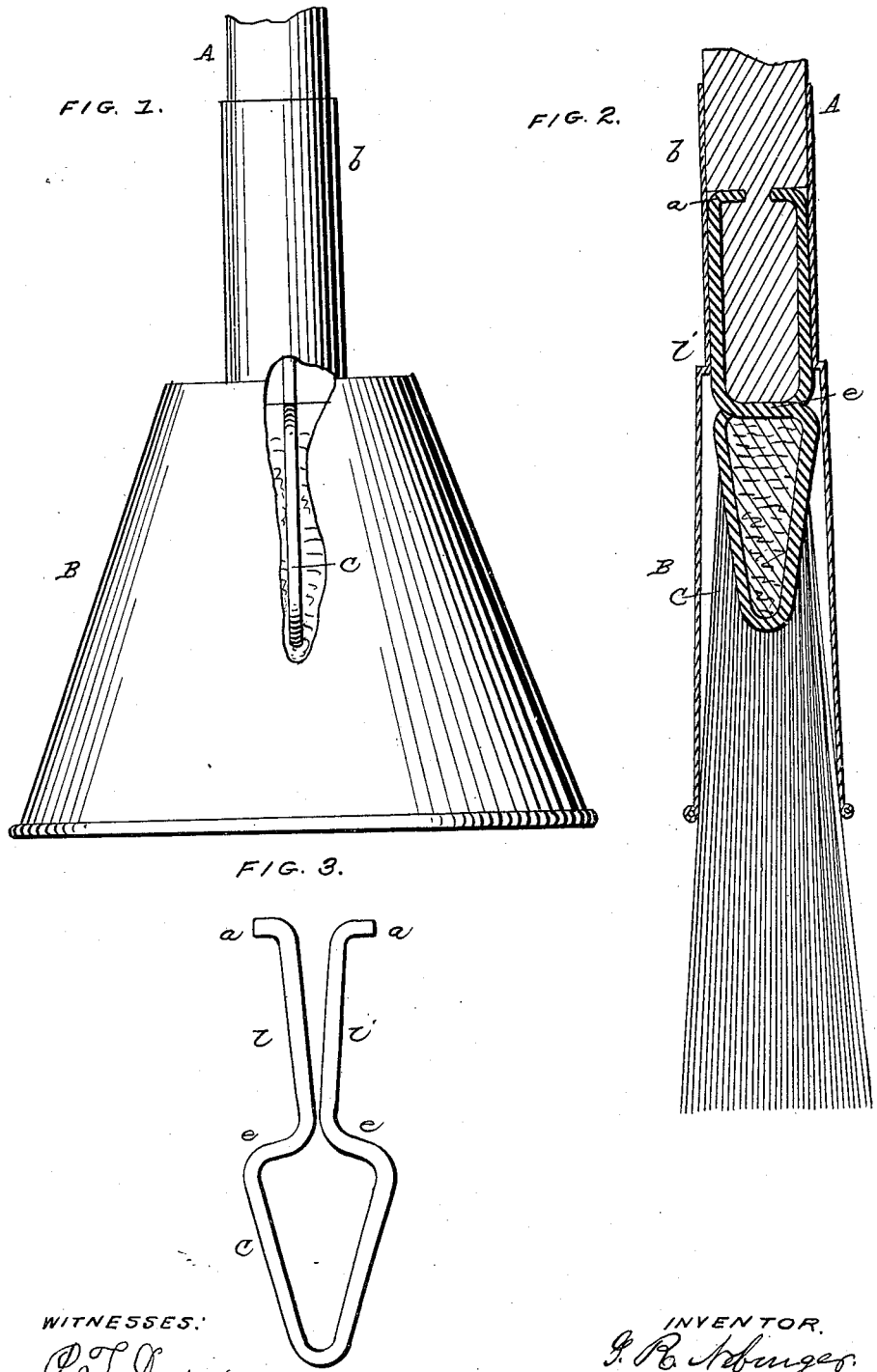

UNITED STATES PATENT OFFICE.

G. R. NEBINGER, OF LEWISBERRY, PENNSYLVANIA.

IMPROVED BROOM-HEAD.

Specification forming part of Letters Patent No. 54,391, dated May 1, 1866.

*To all whom it may concern:*

Be it known that I, G. R. NEBINGER, of Lewisberry, in the county of York and State of Pennsylvania, have invented certain new and useful Improvements in Broom-Heads; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side view having a portion of the cap or case broken away. Fig. 2 is a vertical section taken on the line $x$ $x$ of Fig. 1, and Fig. 3 a view of the loop detached.

My invention consists in forming the loop that holds the corn of a single piece of wire bent in a peculiar form, and securing it to the handle in a novel manner, as hereinafter described.

A represents the handle, made in the usual manner.

C represents the loop, formed of a single piece of wire bent in the form shown in Fig. 3. This loop, when thus open, is filled with corn, the upper ends of the stalks being shaved off on one side, so as to make the ends smaller and not occupy so much space as they otherwise would. When thus prepared the ends are inserted through the loop C and bent down, the stalks being inserted alternately from opposite sides of the loop, and thus binding and holding each other in place. After the proper quantity of corn has been thus secured the loop is compressed, so as to cause the upper portions, $l$ and $l'$, to shut past each other, and causing the horizontal portions $e$ to lie side by side, the points $a$ thus being brought opposite each other, as shown in Fig. 2. The handle has a groove cut in each side, of proper size to receive the stems $l$ and $l'$ of the loop, with recesses for the points $a$ to fit into, the portions $e$ also fitting in a groove cut in the end of the handle. To attach it to the handle the points $a$ are spread apart far enough to permit them to be shoved up the grooves in the sides of the handle until they enter the recesses provided for them, as shown in Fig. 2. A cap, B, is provided, having a sleeve, $b$, fitted over the handle, and when the loop C, with the corn in it, is thus secured to the handle A this cap B is shoved down over it, the sleeve $b$ serving to hold the loop firmly in place, while the body of the cap B confines the brush and supports it.

Having thus described my invention, what I claim is—

A broom-head consisting of the loop C, constructed as shown and described, and used in combination with the handle A and cap B, provided with the sleeve $b$, all arranged and operating as herein set forth.

G. R. NEBINGER.

Witnesses:
JOS. PECK,
P. T. DODGE.